US012800468B2

(12) United States Patent
Mun et al.

(10) Patent No.: US 12,800,468 B2
(45) Date of Patent: Nov. 17, 2026

(54) APPARATUS AND METHOD FOR MEASURING OPTICAL PARTICLE USING MEASUREMENT REFERENCE VALUE DIFFERENCE

(71) Applicant: KOREA RESEARCH INSTITUTE OF STANDARDS AND SCIENCE, Daejeon (KR)

(72) Inventors: Jihun Mun, Daejeon (KR); Sangwoo Kang, Daejeon (KR)

(73) Assignee: KOREA RESEARCH INSTITUTE OF STANDARDS AND SCIENCE, Daejeon (KR)

(*) Notice: Subject to any disclaimer, the term of this patent is extended or adjusted under 35 U.S.C. 154(b) by 184 days.

(21) Appl. No.: 18/585,104

(22) Filed: Feb. 23, 2024

(65) Prior Publication Data

US 2025/0271347 A1 Aug. 28, 2025

(51) Int. Cl.
*G01N 15/1434* (2024.01)
*G01N 15/14* (2024.01)

(52) U.S. Cl.
CPC . *G01N 15/1434* (2013.01); *G01N 2015/1486* (2013.01); *G01N 2015/1493* (2013.01)

(58) Field of Classification Search
CPC ....... G01N 15/1434; G01N 2015/1486; G01N 2015/1493; G01N 15/1429; G01N 2015/1029
See application file for complete search history.

(56) References Cited

U.S. PATENT DOCUMENTS

| | | | | |
|---|---|---|---|---|
| 6,794,671 B2 * | 9/2004 | Nicoli | ................ | G01N 15/0227 250/222.2 |
| 2019/0195765 A1 | 6/2019 | Chen et al. | | |
| 2021/0181080 A1 * | 6/2021 | Zhang | ................ | G01N 15/0211 |

FOREIGN PATENT DOCUMENTS

| | | | |
|---|---|---|---|
| CN | 113552050 A | 10/2021 | |
| KR | 10-1857950 B1 | 5/2018 | |
| KR | 10-2227433 B1 | 3/2021 | |
| TW | 201928329 A | 7/2019 | |
| WO | WO-2022114452 A1 * | 6/2022 | ......... G01N 15/1429 |

OTHER PUBLICATIONS

Machine translation of Mun (WO-2022114452-A1) (Year: 2022).*
Taiwanese Office Action for related TW Application No. 113107141 mailed Jan. 21, 2025 from Taiwan Intellectual Property Office.

* cited by examiner

*Primary Examiner* — Tarifur R Chowdhury
*Assistant Examiner* — Paul Schnase
(74) *Attorney, Agent, or Firm* — Paratus Law Group, PLLC

(57) ABSTRACT

An optical particle measuring apparatus according to one embodiment, includes a light irradiation part, a measuring part, and at least one control part operably connected to the light irradiation part and the measuring part, wherein the at least one control part is configured to irradiate a particle measurement space with first light for measuring particles, obtain a first detection signal for second light, which is generated from the first light influenced by the particles in the particle measurement space, identify a second detection signal on the basis of a measurement reference value corresponding to a particle size, and measure the number of particles corresponding to the particle size on the basis of the second detection signal.

6 Claims, 8 Drawing Sheets

APPARATUS AND METHOD FOR MEASURING OPTICAL PARTICLE USING MEASUREMENT REFERENCE VALUE DIFFERENCE

ACKNOWLEDGEMENT

The first acknowledgment is for a project with the unique number 1415188192 and project number 00265582, overseen by the Ministry of Trade, Industry and Energy. The Korea Evaluation Institute of Industrial Technology managed this project, which was titled “Core Technology Development for Carbon-Neutral Industrial Sector.” The specific research task was the development of process monitoring and analysis technology for greenhouse gases in semiconductor etching processes. The Korea Research Institute of Standards and Science carried out the project, contributing 50% to the research, over the period from Jan. 1, 2024, to Dec. 31, 2024.

The second acknowledgment relates to a project identified by the unique number 24011100 and project number GP2024-0012-04, administered by the Ministry of Science and ICT. The National Research Council of Science & Technology was responsible for managing this project, aimed at operational support for the Korea Research Institute of Standards and Science. The research task focused on developing core technology for advanced measurement equipment, with the Korea Research Institute of Standards and Science also executing this project. They contributed 50% to the research, which was conducted from Jan. 1, 2024, to Dec. 31, 2024.

BACKGROUND

The present invention relates to a particle measuring apparatus and a particle measuring method, and more particularly, to an apparatus and method for measuring an optical particle using a measurement reference value difference, capable of measuring the number of particles per size range at high accuracy without using an additional component such as a flow nozzle or a flat-top optical system by using the measurement reference value difference used to determine noise in a light detection signal.

In various fields, there is a need for a technique of measuring the number (count) of particles present in a specific space by classifying the particles on the basis of their size ranges.

For example, processes requiring high accuracy, such as a semiconductor process and a display process, are carried out under strictly restricted conditions since the presence of contaminant particles above a certain level in a process chamber may lead to a fatal product defect.

Contaminant particle measurement inside the chamber is required for contamination control, and as one of contaminant particle measuring methods, a particle distribution state in a particular chamber or space may be measured in real time using an optical measurement apparatus.

An optical particle measuring apparatus utilizes the principle that the intensity of scattered light generated when a laser hits a particle is transformed to a size.

In general, the smaller the particle size, the smaller the intensity of scattered light, which can be calculated using Mie theory. The intensity of scattered light is proportional to the intensity of incident light, and thus the intensity of the incident light must be strong in order to measure a particle of a small size.

For this reason, a laser must be inevitably focused in order to measure a particle of a small size.

FIG. 1 illustrates that incident light 12 generated from a laser source 11 is focused on a flow channel 15 though several optical components. Here, the flow channel 15 is a space in which particles to be measured are present.

Referring to the following Equation 1, an intensity lo of incident light must be constant for measurement of accurate particle size using the Mie theory.

$$I_{scat} = I_0 \frac{1}{R^2} \sigma'_{scat}$$ [Equation 1]

Here, $I_{scat}$ is an intensity of scattered light, R is a distance from a scattered light generation point to a detector, and $\sigma_{scat}'$ is a function of particle size.

At this point, the intensity of scattered light for particles of the same size may differ depending on which position of focused incident light the particle passes through.

This is because a cross section 21 of light is not uniform with respect to an r-axis direction. Because of this, when the scattered light is transformed into a particle size, the same particle measured again may be recognized as having a different size, and as a result, an optical particle measuring apparatus is unable to measure an accurate size.

In order to solve the accuracy problem regarding particle size measurement, the following technique has been used in the related art.

First, as an example illustrated in FIG. 2, a method that allows particles to pass to a specific position of incident light using a flow nozzle may be used.

When this method is used, because the particles pass only through a designated position of incident light, the intensity of incident light becomes constant to enable the accurate size measurement.

Most contaminant particle measuring instruments currently adopt this method. However, while this method can be used under normal pressure (atmospheric pressure), it is difficult to use this method in processes that are sensitive to pressure changes, such as vacuum processes. In particular, the above method may influence process conditions, and thus cannot be used in industries that require a vacuum environment, such as semiconductors and displays.

Further, the above method requires an additional cost of making a flow nozzle, which generates a phenomenon of the flow nozzle being blocked by particles, thereby causing difficulty in control.

As another method exemplified in FIG. 3, a technology that allows more accurate measurement of particle size by making the intensity of light uniform using a flat-top module 17 is disclosed in Korean Registered Patent No. 10-1857950, entitled “HIGH-ACCURACY REAL-TIME FINE PARTICLE SIZE AND COUNT MEASUREMENT APPARATUS.”

That is, in order to solve the problem of size measurement accuracy caused by variations in incident light intensity, Registered Patent No. 10-1857950 utilizes a method of making the intensity of the incident light 12 uniform in the r-axis direction, which represents the cross section 22 of light.

When an optical system (lens) that makes the incident light uniform is configured, the intensity of incident light in the r-axis direction can be made uniform and the size of scattered light remains unchanged regardless of where the particle passes.

However, a particle measuring apparatus to which the method is applied must use an aspherical optical system since the configuration of an optical system is important, which increases a manufacturing cost exponentially, and has the problem not enabling measurement of nano-sized particles due to the intensity of focused light being weaker than that of the general focused light.

In order to solve such a problem, Korean Registered Patent No. 10-2227433 discloses a technology through which the number of particles per size range can be measured with high accuracy by using laser power scanning, in which particles are sequentially irradiated with lasers of various powers.

However, Registered Patent No. 10-2227433 has a disadvantage in that it is difficult to keep the laser power constant.

That is, as the laser output changes with sensitivity to environmental variables such as thermal aging and temperature, the accuracy of particle count measurement may decrease.

In addition, the sequential radiation of lasers with various powers may lead to increased equipment complexity and longer measurement times.

SUMMARY

The present invention has been proposed to resolve the above-described problems, and the present invention is directed to providing a high-accuracy optical particle measuring apparatus and method through which the number of particles per size range can be measured with high accuracy using a measurement reference value difference to determine noise in a light detection signal, rather than changing the laser power.

According to an aspect of the present invention, there is provided a high-accuracy optical particle measuring apparatus including a light irradiation part, a measuring part, and at least one control part operably connected to the light irradiation part and the measuring part, wherein the at least one control part is configured to irradiate a particle measurement space with first light for measuring particles, obtain a first detection signal for second light, which is generated from the first light influenced by the particles in the particle measurement space, identify a second detection signal on the basis of a measurement reference value corresponding to a particle size, and measure the number of particles corresponding to the particle size on the basis of the second detection signal, the second detection signal is a portion of the first detection signal that is greater than or equal to the measurement reference value, the particle size is the smallest particle size within a particle size range, and the particle size range includes sizes of the particles corresponding to the second detection signal.

Further, the measurement reference value may be determined on the basis of at least one of an intensity of the first light and a detection sensitivity of the measuring part for the second light.

Further, the measurement reference value may be determined on the basis of a configuration of an optical system included in the light irradiation part.

Further, the first light may include a laser, and the second light may include light scattered from the particle, or light that has been partially absorbed or attenuated by the particle.

Further, the measuring part may calculate "c1, c2, . . . , and cm" using "$f(V_1)$ to $f(V_m)$" and "C[V1] to C[Vm]," where ci is the number of particles belonging to a particle size range Ri to be calculated, Vk is a minimum measurement reference value at which particles of size dk can be measured, C[Vk] is the total number of particles measured by applying the measurement reference value Vk, and f(Vk) is the number of particles when the measurement reference value is Vk and is a function of an experimentally determined measurement reference value.

Further, when $c_i[V_k]$ is the number of particles in the particle size range Ri measured by applying the measurement reference value $V_k$, the measuring part calculates "c1, c2, . . . , and cm" through equations each transformed to include at least one of "$f(V_1)$ to $f(V_m)$" and at least one of "$C[V_1]$ to $C[V_m]$," by using the equations of $$c_i = c_i[V_1] + c_i[V_2] + \ldots + c_i[V_m],$$

$$C[V_k] = c_1[V_k] + c_2[V_k] + \ldots + cm[V_k],$$

$$c_i[V_k] = 0,\ (i < k),$$

$$c_i[V_k] = c_i[V_k],\ (i = k),\ \text{and}$$

$$c_i[V_k] = \frac{f(Vk)}{f(Vi)} \times ci[Vi],\ (i > k).$$

A high-accuracy optical particle measuring apparatus and method according to the present invention can calculate the number of particles per size range with high accuracy by analyzing a signal, which is detected by a detector, using measurement reference values set to correspond to various particle sizes rather than changing the power of a laser.

Accordingly, compared to changing the power of a laser, the number of particles per size range can be more stably measured, accuracy can be maintained, and the measurement can be more simply and conveniently implemented.

Since an additional component, such as a flow nozzle or a flat-top optical system, is not used, development cost of a particle measuring apparatus can be reduced, enabling the particle measuring apparatus to be used regardless of atmospheric pressure or vacuum environment.

A particle measuring apparatus with improved accuracy can be developed using an algorithm, and the accuracy can be improved through an algorithm upgrade on an existing apparatus.

In particular, since a signal is processed in software rather than giving any change to a detector, there is no added burden on a physical circuit of the detector, and a memory of a computer device responsible for signal processing can be utilized, allowing for faster signal processing.

DETAILED DESCRIPTION

The present invention may be embodied in many different modifications and alterations and have several embodiments, and particular embodiments will be exemplified in drawings which are to be described in detail in the detailed descriptions. However, it should be appreciated that the present invention is not intended to be limited to particular embodiments but to encompass equivalent alterations and/or modifications within the gist and technical scope of the present invention.

In describing the present invention, detailed description of known related technologies may be omitted when it is believed that such detailed description would obscure the gist of the present invention.

The terms used herein are for the purpose of describing particular embodiments only and are not intended to be limiting of the invention. A singular expression includes a plural expression unless the context clearly indicates otherwise.

In the present invention, terms such as "includes" or "has" are intended to indicate the existence of characteristics, numbers, steps, operations, components, parts, or combinations thereof disclosed in the specification. The terms "includes" and "has" should be understood as not precluding the possibility of existence or addition of one or more other characteristics, numbers, steps, operations, components, parts, or combinations thereof.

Terms including ordinal numbers such as "first," "second," or the like may be used to explain various elements, but it will be appreciated that the elements are not limited to such terms. These terms are merely used to distinguish one component from another.

Figure 1:
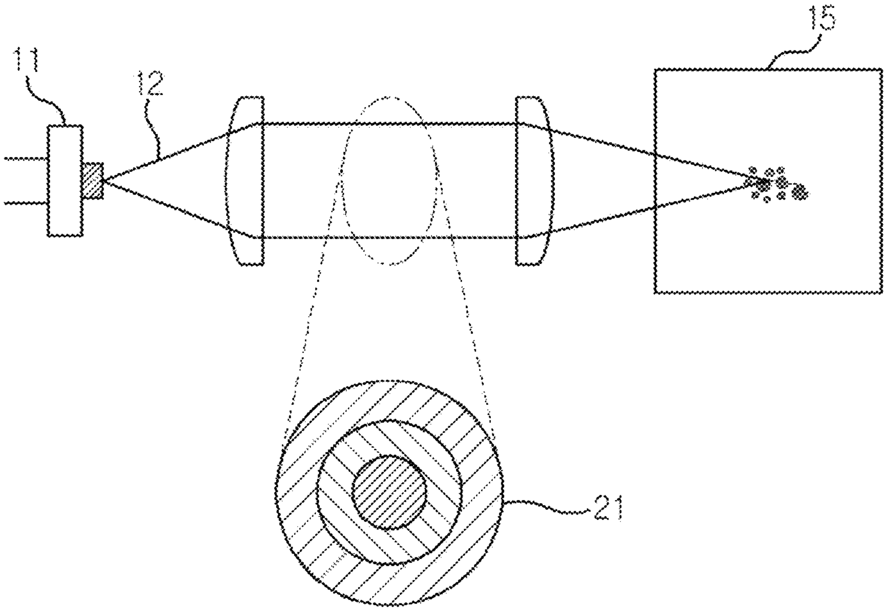
FIG. 1 is an example explaining the measurement of particles using focusing of light.
Figure 2:
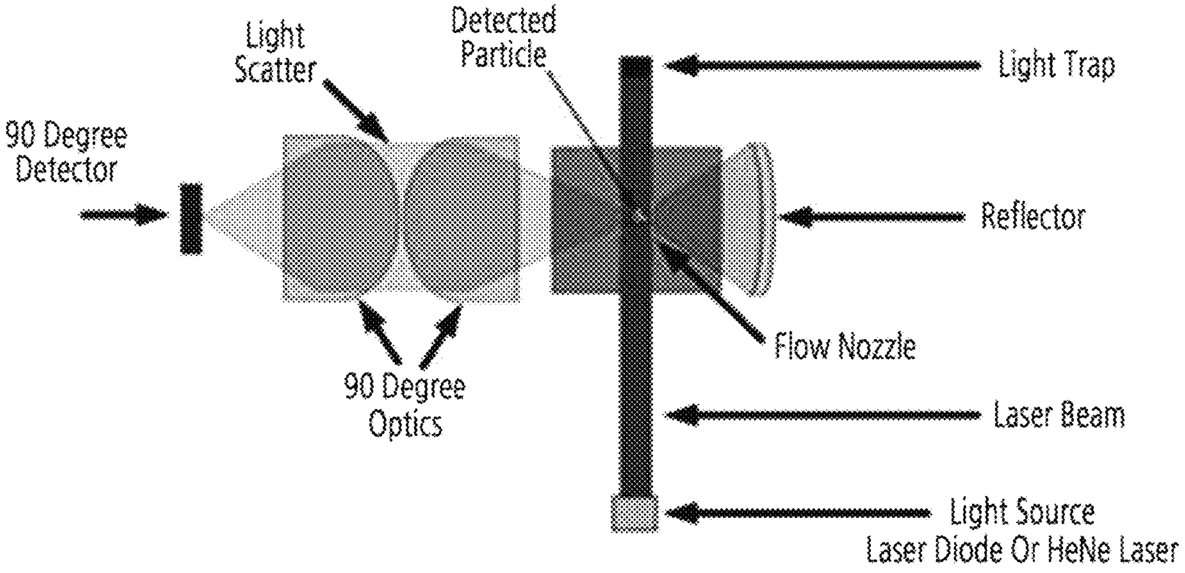
FIG. 2 is an example of using a flow nozzle in the measurement of particles.
Figure 3:
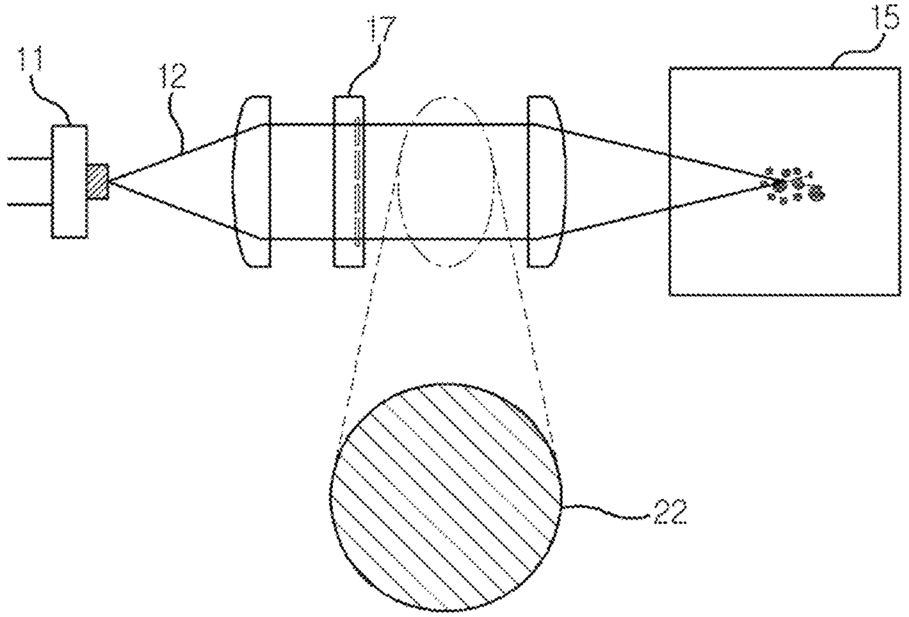
FIG. 3 is an example of a method enabling an r direction intensity of light to be uniform.
Figure 4:
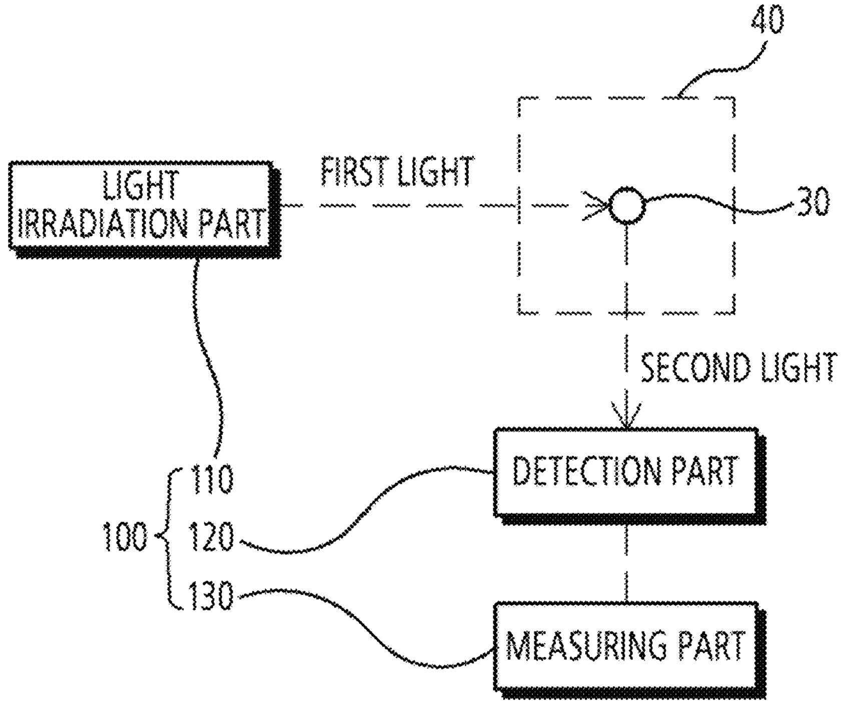
FIG. 4 illustrates a high-accuracy optical particle measuring apparatus according to one embodiment of the present invention.

Referring to FIG. 4, a high-accuracy optical particle measuring apparatus 100 according to the present invention includes a light irradiation part 110 configured to irradiate a particle measurement space 40 with first light for measuring particles, and a detection part 120 configured to detect second light, which is generated from the first light radiated by the light irradiation part 110 and affected by a particle 30 present in the particle measurement space 40, and a measuring part 130 configured to measure the number (count) of particles using a signal detected through the detection part 120.

The particle measurement space 40 is a measurement region in which particles to be measured are present.

The light irradiation part 110 may be variously configured to irradiate the particle measurement space 40 with the first light.

The first light may be variously configured as necessary, and as a specific example, a laser may be used as the first light.

The first light may be radiated onto at least one particle present in the particle measurement space 40.

The first light may be formed differently depending on a configuration of an optical system in the light irradiation part 110. For example, by changing the arrangement structure of lenses included in the light irradiation part 110, the first light may be focused differently on the particle measurement space 40.

A measurement reference value to be described below may be determined by reflecting information about the optical system configuration.

The second light may include various types of light that may be used to measure the particle, such as light scattered from the particle 30, light that has been partially absorbed or attenuated by the particle 30, and the like.

Hereinafter, for convenience of description, the first light will be described as a laser as an example, and the second light will be described as light scattered from the particle as an example.

The detection part 120 may include a detector configured to detect light generated from the laser radiated through the light irradiation part 110 and scattered from particles present in the particle measurement space. The detector may be variously configured, and a photodiode (PD), an avalanche photodiode (APD), a photomultiplier tube (PMT), or the like may be utilized.

Figure 5:
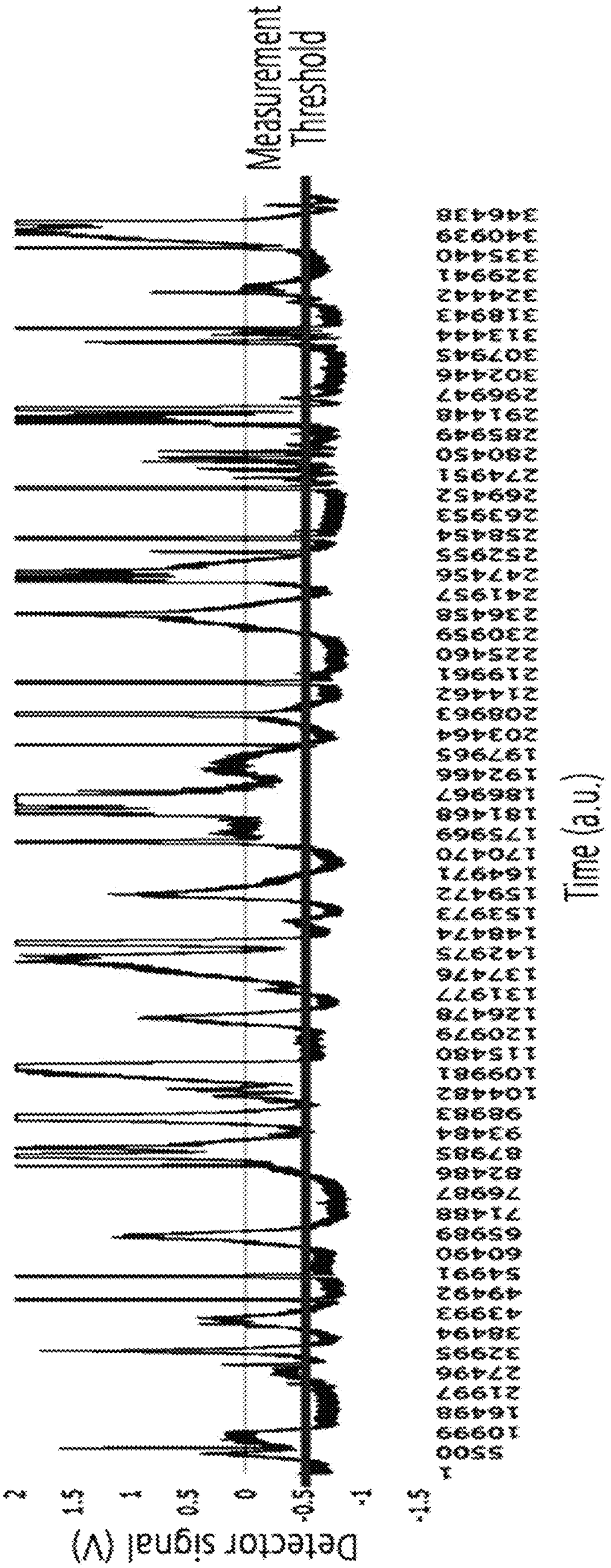
FIG. 5 is an example explaining a measurement reference value for distinguishing noise.

FIG. 5 illustrates an example of a signal detected by a detector over time, illustrating an example of a measurement reference value used for distinguishing noise.

In order to analyze a light detection signal and measure the number of particles, it may be necessary to set a measurement reference value for the detector to determine noise. Here, the measurement reference value is a threshold value set to measure the number of particles in consideration of particle size ranges, and may be determined according to at least one criterion.

In general, a signal detected through the detector is expressed as a voltage or a current, and thus the measurement reference value may be expressed as a voltage or a current.

However, the present invention is not limited thereto, and any type of signal may be applied. Hereinafter, for convenience of description, the measurement reference value is represented by the voltage symbol, V, but this representation may also be applied even when the measurement reference value is a current.

Further, the measurement reference value in the present invention is not necessarily limited to a specific numerical value, but may be a value corresponding to a certain range. Specifically, the measurement reference value is a value corresponding to the size of a particle to be measured, and may be any reference value or range of values that allows the detector to distinguish between a signal corresponding to a particular particle and signals corresponding to other particles. Here, the other particles may be particles that have size ranges different from the particular particle.

According to one embodiment of the present invention, the measurement reference value may be set according to at least one criterion. Specifically, the measurement reference value may be set differently depending on the intensity of incident light, detection sensitivity, a particle size, and an optical system configuration.

The intensity of incident light is the intensity of the first light radiated into the particle measurement space 40 through the light irradiation part 110, and may be controlled by power supplied to the light irradiation part 110.

The detection sensitivity is the sensitivity or performance of the detector for measuring the second light, which may be controlled by the power supplied to the detector.

The intensity of the first light may be proportional to the intensity of the second light, so that a stronger signal can be obtained from the scattered light by increasing the intensity of the first light or increasing the detection sensitivity of the detector.

Figure 7:
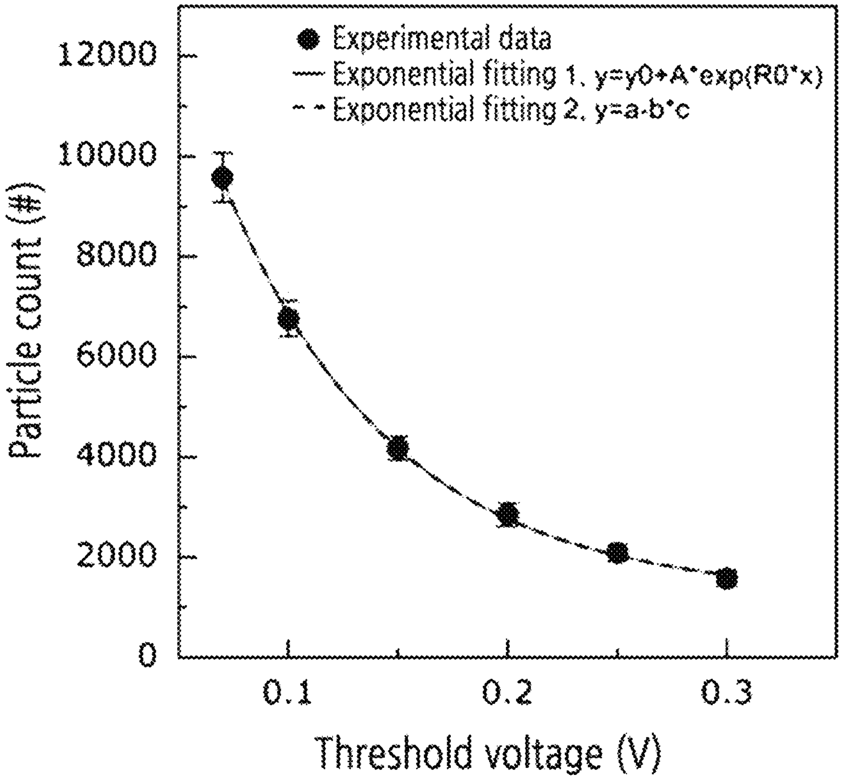
FIG. 7 is an example of an experimentally determined transformation function f(V).

FIG. 7 illustrates that the smaller the absolute value of the measurement reference value, the smaller a particle size can be measured.

The measuring part 130 calculates the number of particles belonging to each particle size range Ri, by using the number of particles measured when each measurement reference value is applied.

Table 1 below illustrates definitions of symbols used in the description of the present invention, which will be described below as an example of measuring the number of particles belonging to four particle size ranges R1 to R4.

However, this is for convenience of description only, and the number of particle size ranges used for measuring the number of particles may be variously configured as necessary.

TABLE 1

| Particle size range ($R_i$) | Number of particles (particle count) ($c_i$) | Measurement reference value ($V_k$) | $c_i[V_k]$ | $C[V_k]$ |
|---|---|---|---|---|
| $d_1 \le R_1 < d_2$ | $c_1$ | $V_1$ | $c_1[V_1]$, $c_1[V_2]$, $c_1[V_3]$, $c_1[V_4]$ | $C[V_1]$ |
| $d_2 \le R_2 < d_3$ | $c_2$ | $V_2$ | $c_2[V_1]$, $c_2[V_2]$, $c_2[V_3]$, $c_2[V_4]$ | $C[V_2]$ |
| $d_3 \le R_3 < d_4$ | $c_3$ | $V_3$ | $c_3[V_1]$, $c_3[V_2]$, $c_3[V_3]$, $c_3[V_4]$ | $C[V_3]$ |
| $d_4 \le R_4$ | $c_4$ | $V_4$ | $c_4[V_1]$, $c_4[V_2]$, $c_4[V_3]$, $c_4[V_4]$ | $C[V_4]$ |

di: Particle size
Ri: Size range of particles to be measured while classifying number of particles.
(when "i < m," "$d_i \le R_i < d(i+1)$," and when "i = m," "$R_i \ge d_m$")
ci: Number of particles having size corresponding to each particle size range Ri, which is value to be finally obtained
$V_k$: Minimum measurement reference value at which particles of minimum size $d_k$ can be measured for particle size range $R_k$, which can be obtained from calibration experiment in which standard particle sample having only specific size is measured
$c_i[V_k]$: Number of particles (particle count) in particle size range Ri measured using $V_k$
$C[V_k]$: Total number of particles measured using $V_k$
(i and k = 1 to m)

That is, a measurement reference value corresponding to a particular particle size may be set differently according to the intensity of the incident light and/or the detection sensitivity.

In addition, the optical system configuration is related to the degree of focusing of incident light, and thus, when the degree of focusing of the incident light is adjusted by changing the optical system configuration, the measurement reference value may be set differently even when the intensity of the incident light is the same.

Accordingly, the particle measuring apparatus according to one embodiment of the present invention may determine the measurement reference value by comprehensively considering information about the intensity of incident light, the detection sensitivity, the particle size, and the optical system configuration, and classify the detected signal by particle size on the basis of the determined measurement reference value.

Figure 6:
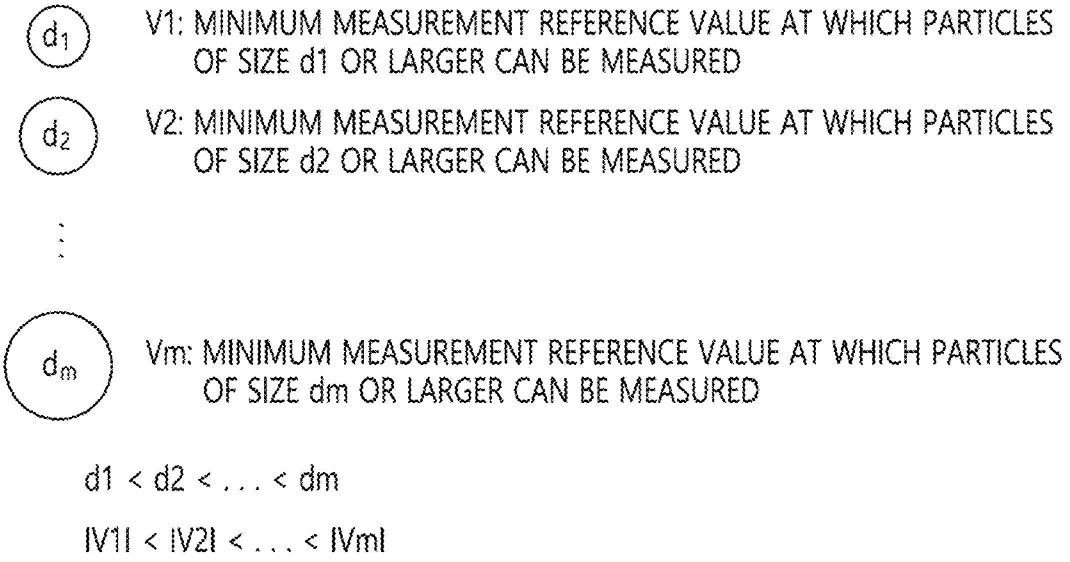
FIG. 6 is an example explaining measurement reference values being set according to particle sizes.

In FIG. 6, $V_k$ ($1 \le k \le m$) is a measurement reference value at which light scattered from particles having a particle size greater than or equal to $d_k$ can be detected.

Assuming that a greater subscript number of d indicates a larger particle size, the greater the subscript number of V, the greater the absolute value of the measurement reference value.

Depending on the measurement reference value, particles corresponding to each particle size range may or may not be measured.

For example, in relation to $c_1[V_1]$, $V_1$ is defined as a minimum measurement reference value at which particles of size $d_1$ can be measured, so that $c_1[V_1]$ can be measured.

However, in relation to $c_1[V_2]$, particles having a size corresponding to a particle size range $R_1$ cannot be measured since $V_2$ is defined as a minimum measurement reference value at which particles of size $d_2$ can be measured. Thus, the relationship of "$c_1[V_2]=0$" is established.

The smaller the subscript i in the particle size "$d_i$," the smaller the size of the particle, and the particle corresponding to $d_m$ is the largest size.

A particle count ci corresponding to each particle size range $R_i$ may be expressed by Equation 1 below.

$$c_1 = c_1[V_1] + c_1[V_2] + c_1[V_3] + c_1[V_4] \quad \text{[Equation 1]}$$

$$c_2 = c_2[V_1] + c_2[V_2] + c_2[V_3] + c_2[V_4]$$

$$c_3 = c_3[V_1] + c_3[V_2] + c_3[V_3] + c_3[V_4]$$

$$c_4 = c_4[V_1] + c_4[V_2] + c_4[V_3] + c_4[V_4]$$

Each item in Equation 1 above may be expressed as Equation 2 below.

$$1)\ i < k,\ c_i[V_k] = 0 \quad \text{[Equation 2]}$$
$$2)\ i = k,\ c_i[V_k] = c_i[V_k]$$
$$3)\ i > k,\ c_i[V_k] = \frac{f(Vk)}{f(Vi)} \times ci[Vi]$$

As described above, under the condition "i<k," $c_i[V_k]=0$. In addition, under the condition "i>k", it can be expressed as $$c_i[V_k] = \frac{f(Vk)}{f(Vi)} \times ci[Vi].$$

Here, f(V) is a function of the measurement reference value determined experimentally, and is the number of particles when the measurement reference value is V. That is, a value of "$f(V_k)/f(V_i)$" may be calculated from a calibration experiment in which the number of particles is measured according to the measurement reference value.

FIG. 7 illustrates the results of a particle count calibration experiment and regression analysis fitting for the measurement reference value, in which f(V) was regressed using two exponential functions, and high accuracy was confirmed with both functions having a coefficient of determination (R-square) of 99.95%.

In the example of FIG. 7, f(V) used exponential functions of "y=y0+A×exp(R0×x)," and "$y=a-b\times c^x$," but is not limited thereto. Any mathematically expressible function can be used, and the equation for the function f(V) can be inferred by regressing on a function with a high coefficient of determination.

Figure 8:
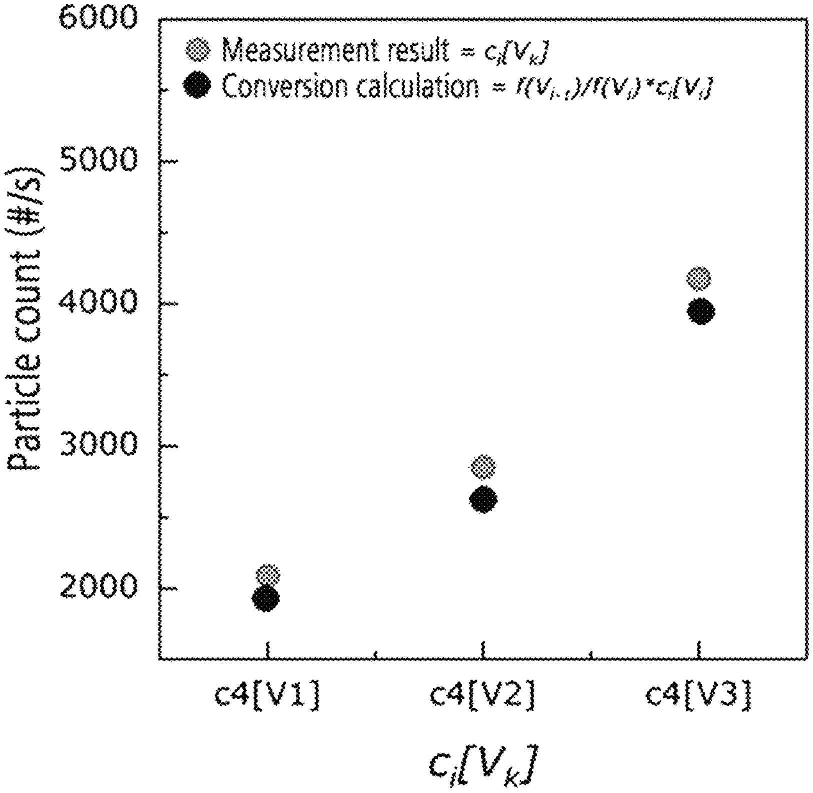
FIG. 8 is an example of a comparison of a value of $c_i[V_k]$ obtained by measurement and a value calculated using the transformation function f(V).

FIG. 8 illustrates the results of comparing values of $c4[V_1]$, $c4[V_2]$, and $c4[V_3]$ actually measured in the calibration experiment with $$\frac{f(V1)}{f(V4)}c4[V4],\ \frac{f(V2)}{f(V4)}c4[V4],\ \text{and}\ \frac{f(V3)}{f(V4)}c4[V4]$$

calculated using f(V) obtained from the regression analysis, in order to prove the expression $$c_i[V_k] = \frac{f(Vk)}{f(Vi)} \times ci[Vi]$$

when i>k.

Figure 9:
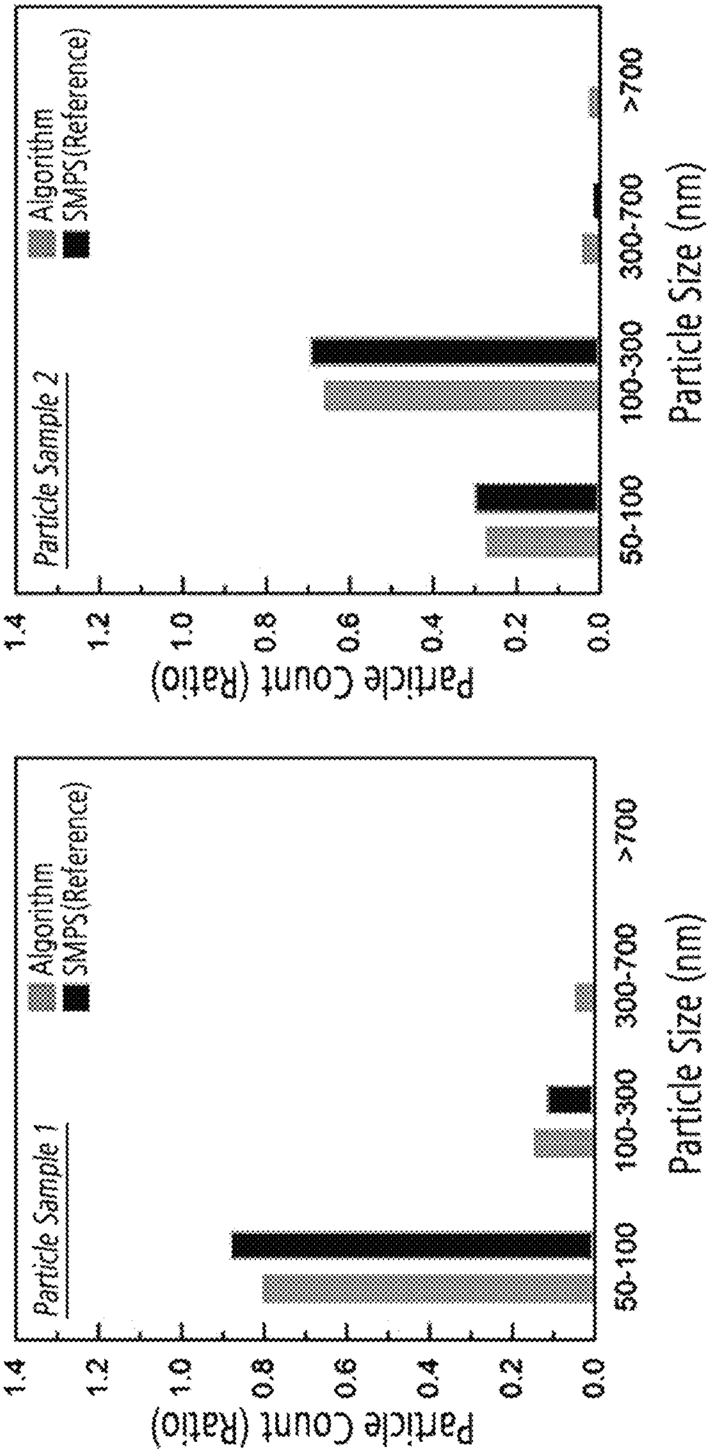
FIG. 9 is an example of a comparison of particle size distributions of samples measured using the method according to the present invention and a scanning mobility particle sizer (SMPS), which is a reference instrument.

FIG. 9 illustrates the comparison of a particle size distribution (expressed as "Algorithm") measured according to the present invention with a particle size distribution (expressed as "SMPS") measured using a scanning mobility particle sizer (SMPS), which is a reference instrument, for each of two particle samples to validate the use of the measurement reference value.

Equation 1 above may be transformed into Equation 3 below using Equation 2.

$$c1 = c1[V1] \quad \text{[Equation 3]}$$
$$c2 = \frac{f(V1)}{f(V2)}c2[V2] + c2[V2]$$

-continued $$c3 = \frac{f(V1)}{f(V3)}c3[V3] + \frac{f(V2)}{f(V3)}c3[V3] + c3[V3]$$
$$c4 = \frac{f(V1)}{f(V4)}c4[V4] + \frac{f(V2)}{f(V4)}c4[V4] + \frac{f(V3)}{f(V4)}c4[V4] + c4[V4]$$

However, when measuring a sample with an unknown size distribution, the total number of particles $C[V_k]$ can be obtained using a specific measurement reference value, but the number of particles corresponding to each particle size range cannot be distinguished.

Thus, an additional process of transforming ci, which is a value to be obtained, into a function of $C[V_k]$ is required.

As defined in Table 1, $C[V_k]$ is the total number of particles in a sample to be measured with an unknown size distribution when a measurement reference value $V_k$ is applied for measurement. Thus, $C[V_k]$ can be expressed as Equation 4 below.

$$C[V_1] = c_1[V_1] + c_2[V_1] + c_3[V_1] + c_4[V_1] \quad \text{[Equation 4]}$$
$$C[V_2] = c_1[V_2] + c_2[V_2] + c_3[V_2] + c_4[V_2]$$
$$C[V_3] = c_1[V_3] + c_2[V_3] + c_3[V_3] + c_4[V_3]$$
$$C[V_4] = c_1[V_4] + c_2[V_4] + c_3[V_4] + c_4[V_4]$$

Equation 4 above can be expressed as Equation 5 using Equation 2.

$$C[V1] = c1[V1] + \frac{f(V1)}{f(V2)}c2[V2] + \frac{f(V1)}{f(V3)}c3[V3] + \frac{f(V1)}{f(V4)}c4[V4] + c4[V4] \quad \text{[Equation 5]}$$
$$C[V2] = c2[V2] + \frac{f(V2)}{f(V3)}c3[V3] + \frac{f(V2)}{f(V4)}c4[V4]$$
$$C[V3] = c3[V3] + \frac{f(V3)}{f(V4)}c4[V4]$$
$$C[V4] = c4[V4]$$

When Equation 5 is substituted into Equation 3, a size distribution corresponding to each particle size range can be transformed into a function of an actual measurement value as shown in Equation 6 below.

$$c4 = \left(\frac{f(V1) + f(V2) + f(V3)}{f(V4)} + 1\right)C[V4] \quad \text{[Equation 6]}$$
$$c3 = \left(\frac{f(V1) + f(V2)}{f(V3)} + 1\right)\left(C[V3] - \frac{f(V3)}{f(V4)}C[V4]\right)$$
$$c2 = \left(\frac{f(V1)}{J(V2)} + 1\right)C[V2] - \left(\frac{f(V1)}{f(V2)} + 1\right)\frac{f(V2)}{f(V3)}C[V3]$$
$$c1 = C[V1] - \frac{f(V1)}{J(V2)}C[V2]$$

As described above, the particle count ci corresponding to each particle size range Ri can be accurately measured using only the value of $C[V_k]$, which is the total number of particles measured by applying each of the defined measurement reference values, and the transformation function f(V) obtained from the calibration experiment.

In order to calculate the particle count ci corresponding to each particle size range Ri, a minimum measurement reference value at which a minimum particle size di can be detected for each particle size range Ri, and f(V), which is the function of the measurement reference value, should be determined experimentally.

Figure 10:
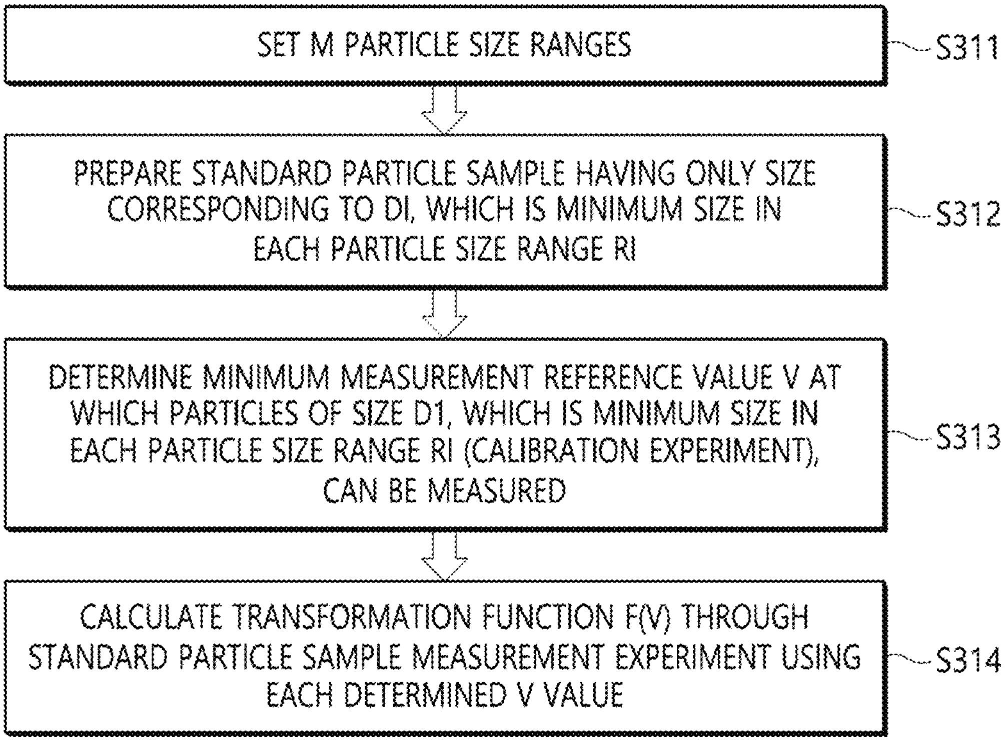
FIG. 10 is an example of an experimental process for determining Ri, V, and f(V).

FIG. 10 illustrates an example of a process for experimentally obtaining $V_k$ and f(V), and a particle size range Ri is first set (S311).

The particle size range Ri may be variously set as necessary.

For example, the particle size range may be set into four sections, and R1 to R4 are respectively set as "50 nm≤R1<100 nm," "100 nm≤R2<300 nm," "300 nm≤R3<700 nm." and "700 nm≤R4."

In addition, a standard particle sample having only a size corresponding to di, which is a minimum size in each particle size range Ri, is prepared (S312).

In the above example, d1=50 nm, d2=100 nm, d3=300 nm, and d4=700 nm.

Next, a minimum measurement reference value $V_k$ at which particles of size d1 can be measured, which is the minimum size in each particle size range Ri, is determined by actual measurement (S313).

In addition, a transformation function f(V) is calculated by performing a standard sample measurement experiment using each V value determined in operation S313 (S314). An example of f(V) is illustrated in FIG. 7.

In operations S311 to S314, experiments are performed to determine parameters for accurately measuring the number of particles per particle size range, which may be referred to as "calibration experiments."

Figure 11:
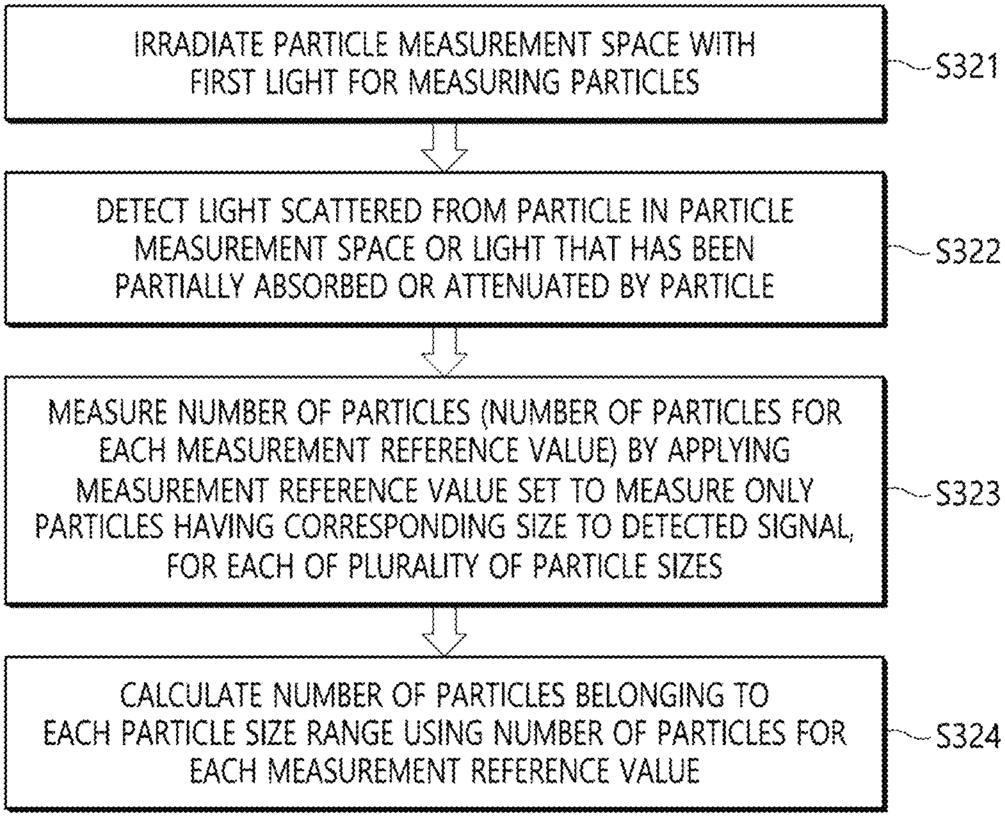
FIG. 11 illustrates a high-accuracy optical particle measuring method using a measurement reference value difference according to one embodiment of the present invention.

FIG. 11 illustrates a high-accuracy optical particle measuring method using a measurement reference value difference according to a first embodiment of the present invention, and in the first embodiment, after experimentally determining measurement reference values $V_1$ and f(V) through a calibration experiment such as the example illustrated in FIG. 10, the number of particles per particle size range is measured for an actual sample to be measured whose size distribution is unknown.

First, a particle measurement space is irradiated with first light for measuring particles through the light irradiation part 110 for a predetermined length of time (S321, first process).

The first light may be variously configured as necessary, and as a specific example, a laser may be used as the first light.

In addition, the detection part 120 detects second light generated from the first light that is radiated through the light irradiation part 110 and affected by the particles in the particle measurement space (S322, second process).

The second light may include various types of light that may be used to measure the particle, such as light scattered from the particle 30, light that has been partially absorbed or attenuated by the particle 30, and the like.

The measuring part 130 then analyzes a signal detected through the detection part 120 to determine the number of particles for a particle size range Ri (third process).

The third process may include measuring the number of particles for each measurement reference value by applying a measurement reference value set to measure only particles having a size corresponding to d1, d2, . . . , and dm, each of which is a minimum particle size for the corresponding particle size range, to the signal detected through the detection part 120 (S323), and calculating the number of particles belonging to each particle size range using the number of particles for each measurement reference value (S324).

The number of particles for each measurement reference value obtained in operation S323 is the total number of particles $C[V_k]$ measured when each measurement reference value is applied.

In addition, the measuring part 130 may measure a particle count ci for each particle size range Ri using Equation 6 in operation S324.

That is, the measuring part 130 may be configured to calculate "c1, c2, . . . , and cm" through respective Equations transformed to include at least one of "$f(V_1)$ to $f(V_m)$" and at least one of "$C[V_1]$ to $C[V_m]$."

Meanwhile, a high-accuracy optical particle measuring method using a measurement reference value difference according to a second embodiment of the present invention relates to a method of accurately calculating, by a computer device, the number of particles belonging to each particle size range on the basis of actually measured values detected by the detector.

Figure 12:
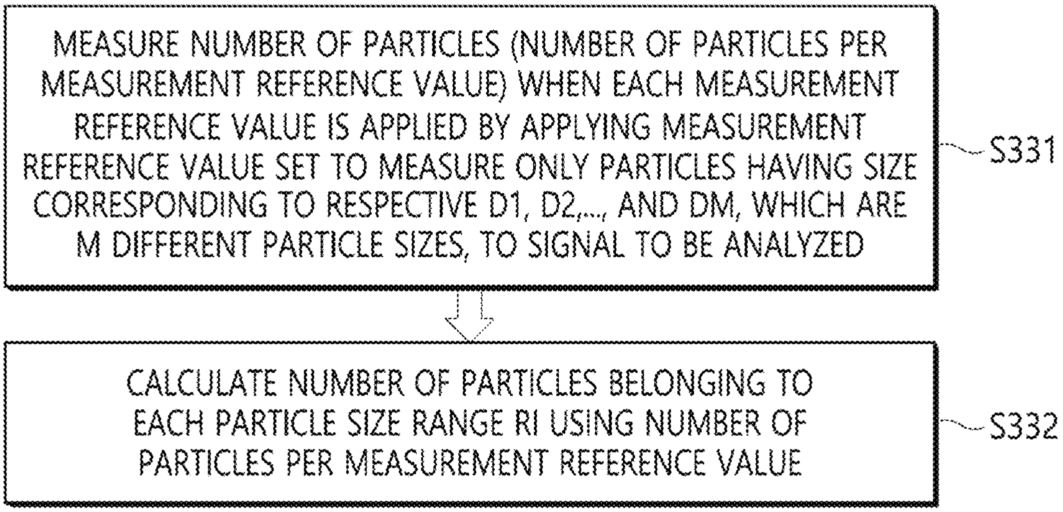
FIG. 12 illustrates a high-accuracy optical particle measuring method using a measurement reference value difference according to another embodiment of the present invention.

Referring to FIG. 12, the high-accuracy optical particle measuring method using a measurement reference value difference according to the second embodiment of the present invention may include a measurement reference value application operation S331 and a calculation operation S332, and may be performed by a computer device.

Here, the computer device may include various types of devices. For example, the computer device may be the measuring part 130, or another computer device capable of transmitting or receiving data in association with the detection part 120 or the measuring part 130.

An example of the latter may include a manager computer device that provides various functions related to particle measurement according to a user command while providing various user interface (UI) screens.

First, the number of particles (the number of particles per measurement reference value) when each measurement reference value is applied is measured by applying a measurement reference value set to measure only particles having a size corresponding to respective d1, d2, . . . , and dm, which are m different particle sizes, to the signal to be analyzed (S331).

Here, the signal to be analyzed is a signal detected by the detector configured to detect light, and may be input in real time or may be data stored on a computer device.

In addition, "d1, . . . , and dm" are minimum particle sizes in each of m particle size ranges Ri ("di≤Ri<d(i+1)" for "i<m" and "Ri≥dm" for "i=m").

The number of particles per measurement reference value, which is measured in operation S331, is the total number of particles $C[V_k]$ when a measurement reference value $V_k$ is applied to the signal detected through the detector.

In addition, when the number of particles $C[V_k]$ per measurement reference value is measured, the particle count ci is calculated separately for each particle size range Ri using Equation 6 described above (S332).

That is, the computer device may be configured to calculate "c1, c2, . . . , and cm" through respective equations transformed to include at least one of "$f(V_1)$ to $f(V_m)$" and at least one of "$C[V_1]$ to $C[V_m]$."

In relation to calculation operation S332, the computer device may store, or receive from an external device as necessary, f(V), which is the number of particles when the measurement reference value is V and a function of the experimentally determined measurement reference value.

Figure 13:
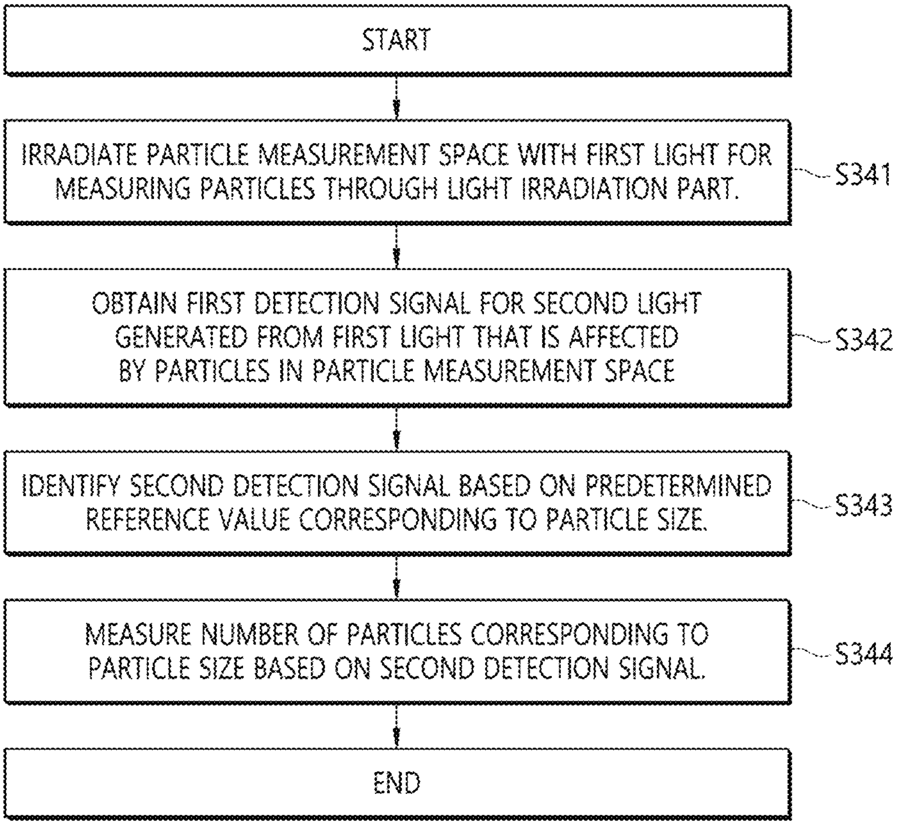
FIG. 13 illustrates a flowchart of the operation of an optical particle measuring device according to an embodiment of the present invention.

FIG. 13 is a flowchart illustrating an operation of an optical particle measuring apparatus according to one embodiment of the present invention.

In operation S341, the optical particle measuring apparatus irradiates a particle measurement space with first light for measuring particles through the light irradiation part.

A plurality of particles may be present in the particle measurement space, and the plurality of particles may be classified into at least one particle size range according to each particle size.

Measuring the particles may mean measuring the number of particles according to a particle size or a particle size range.

In operation S342, the optical particle measuring apparatus obtains a first detection signal for second light generated from the first light that is affected by the particles in the particle measurement space.

The second light may be scattered light resulting from the scattering of the first light by multiple particles. Thus, the second light may include a plurality of scattered lights corresponding to the plurality of particles.

Here, the first detection signal is a signal obtained by analyzing the plurality of scattered lights, and may include signals respectively corresponding to the plurality of particles. More specifically, the first detection signal may include a peak signal corresponding to the plurality of scattered lights.

The peak signal is a signal from which the presence of the particles in the particle measurement space can be confirmed, and may be a partial region of the detected signal, which has a peak value relative to its surrounding regions.

In operation 343, the optical particle measuring apparatus identifies a second detection signal on the basis of the measurement reference value corresponding to the particle size.

The second detection signal may be a portion of the second detection signal lower than the reference value. The second detection signal may include a peak signal corresponding to the plurality of scattered lights.

Here, the reference value may be determined on the basis of at least one of an intensity of the first light and a detection sensitivity of the measuring part for the second light. Further, the reference value may be determined on the basis of a configuration of an optical system included in the light irradiation part.

In operation S344, the optical particle measuring apparatus measures a particle count corresponding to the particle size on the basis of the second detection signal.

Specifically, the optical particle measuring apparatus may identify the number of peak values present in the second detection signal, and then match the identified number of peak values with the number of particles in the particle size range corresponding to the reference value and store them.

Thereafter, the optical particle measuring apparatus may calculate the number of particles corresponding to a plurality of particle sizes by sequentially repeating operation S343 and operation S344 for a plurality of measurement reference values corresponding to a plurality of particle size ranges.

The high-accuracy optical particle measuring method using a measurement reference value difference according to the embodiments of the present invention may be implemented as a code that can be written on a computer-readable recording medium.

In this case, examples of the computer-readable recording medium include all kinds of storage devices for storing data readable by a computer system. Examples of the computer-readable recording medium may include a read-only memory (ROM), a random-access memory (RAM), CD-ROM, a magnetic tape, a floppy disk, an optical data storage device, and the like.

While the present invention has been illustrated and described above on the basis of specific exemplary embodiments, it will be apparent to one of ordinary skill in the art that the present invention may be modified and changed in various ways without departing from the technical features or field of the present invention provided by the claims described below.

The invention claimed is:

1. A particle measuring apparatus comprising:

a light irradiation part;

a measuring part; and at least one control part operably connected to the light irradiation part and the measuring part, wherein the at least one control part is configured to:

irradiate a particle measurement space with first light;

obtain a first detection signal for second light, which is generated from the first light influenced by particles;

identify, from the first detection signal, a second detection signal equal to or greater than a measurement reference value corresponding to a particle size range; and measure a number of particles corresponding to the particle size range based on the second detection signal, wherein the measurement reference value is a minimum reference value allowing detection of particles in the particle size range, wherein the measuring part is configured to:

apply a plurality of measurement reference values corresponding to a plurality of particle size ranges to the first detection signal to obtain, for each measurement reference value, a total number of particles corresponding to signals equal to or greater than the measurement reference value; and subtract, from the total number of particles for a measurement reference value corresponding to a target particle size range among the plurality of particle size ranges, a number of particles to be subtracted, to calculate a number of particles in the target particle size range measured by applying the measurement reference value corresponding to the target particle size range, wherein the number of particles to be subtracted is a number of particles of a particle size range larger than the target particle size range, which is calculated as being measured when applying the measurement reference value corresponding to the target particle size range, and wherein the number of particles to be subtracted is calculated based on a pre-obtained relationship between numbers of particles at different measurement reference values.

2. The particle measuring apparatus of claim 1, wherein the measurement reference value is determined based on at least one of an intensity of the first light and a detection sensitivity of the measuring part for the second light.

3. The particle measuring apparatus of claim 1, wherein the measurement reference value is determined based on a configuration of an optical system included in the light irradiation part.

4. The particle measuring apparatus of claim 1, wherein the first light includes light emitted from a laser source, and wherein the second light includes light scattered from the particle, or light that has been partially absorbed or attenuated by the particle.

5. The particle measuring apparatus of claim 1, wherein the measuring part calculates "c1, c2, . . . , and cm" using "$f(V_1)$ to $f(V_m)$" and "$C[V_1]$ to $C[V_m]$," where ci is the number of particles belonging to a particle size range Ri to be calculated, $V_k$ is a minimum measurement reference value at which particles of size dk are able to be measured, C[Vk] is the total number of particles measured by applying the measurement reference value $V_k$, and $f(V_k)$ is the number of particles when the measurement reference value is Vk and is a function of an experimentally determined measurement reference value.

6. The particle measuring apparatus of claim 5, wherein, when $c_i[V_k]$ is the number of particles in the particle size range Ri measured by applying the measurement reference value $V_k$, the measuring part calculates "c1, c2, . . . , and cm" through equations each transformed to include at least one of "$f(V_1)$ to $f(V_m)$" and at least one of "$C[V_1]$ to $C[V_m]$," by using the equations of $$ci = c_i[V_1] + c_i[V_2] + \ldots + c_i[V_m],$$

$$C[V_k] = c_1[V_k] + c_2[V_k] + \ldots + cm[V_k],$$

$$c_i[V_k] = 0,\ (i < k),$$

$$c_i[V_k] = c_i[V_k],\ (i = k),\ \text{and}$$

$$c_i[V_k] = \frac{f(Vk)}{f(Vi)} \times ci[Vi],\ (i > k).$$

* * * * *